United States Patent
Chossat et al.

(10) Patent No.: US 11,272,118 B2
(45) Date of Patent: Mar. 8, 2022

(54) METHOD FOR PROCESSING SIGNALS FROM AN IMAGING DEVICE, AND ASSOCIATED DEVICE

(71) Applicant: STMICROELECTRONICS (GRENOBLE 2) SAS, Grenoble (FR)

(72) Inventors: Jerome Chossat, Voiron (FR); Benoit Deschamps, Sassenage (FR); Adrien Martin, Grenoble (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 0 days.

(21) Appl. No.: 16/595,192

(22) Filed: Oct. 7, 2019

(65) Prior Publication Data
US 2020/0120257 A1   Apr. 16, 2020

(30) Foreign Application Priority Data
Oct. 11, 2018   (FR) ..................... 1859437

(51) Int. Cl.
| | |
|---|---|
| *H04N 5/235* | (2006.01) |
| *H04N 5/225* | (2006.01) |
| *H04N 5/3745* | (2011.01) |
| *H04N 5/369* | (2011.01) |
| *H04N 5/335* | (2011.01) |
| *G06T 5/50* | (2006.01) |

(52) U.S. Cl.
CPC ............ *H04N 5/2355* (2013.01); *G06T 5/50* (2013.01); *H04N 5/2256* (2013.01); *G06T 2207/20224* (2013.01); *H04N 5/37452* (2013.01)

(58) Field of Classification Search
None
See application file for complete search history.

(56) References Cited

U.S. PATENT DOCUMENTS

| | | | |
|---|---|---|---|
| 9,179,085 B1* | 11/2015 | Rivard | H04N 5/347 |
| 2009/0175555 A1* | 7/2009 | Mahowald | H04N 5/2351 |
| | | | 382/274 |
| 2012/0188423 A1 | 7/2012 | Solhusvik | |
| 2013/0135486 A1 | 5/2013 | Wan | |
| 2016/0080620 A1* | 3/2016 | Shen | H04N 5/2256 |
| | | | 600/109 |
| 2016/0080726 A1* | 3/2016 | Rangarajan | H04N 13/254 |
| | | | 348/46 |
| 2016/0155768 A1 | 6/2016 | Yi | |
| 2016/0366350 A1 | 12/2016 | Roffet et al. | |
| 2017/0026560 A1* | 1/2017 | Whitehouse | H04N 5/2352 |
| 2017/0118424 A1 | 4/2017 | Lule et al. | |
| 2018/0288343 A1 | 10/2018 | McCarten et al. | |

* cited by examiner

*Primary Examiner* — Mark T Monk
(74) *Attorney, Agent, or Firm* — Seed IP Law Group LLP

(57) ABSTRACT

An image device has an array of pixels, each pixel having a photosensitive area, a first storage node and a second storage node. A pixel is illuminated for a first period of time, and charge accumulated on the photosensitive area of the pixel during the first period of time is stored on the first storage node of the pixel. The pixel of the array is illuminated for a second period of time, and charge accumulated on the photosensitive area during the second period of time is stored on the second storage node of the pixel. A first signal is generated based on the charge stored on the first storage node, and a second signal is generated based on the charge stored on the second storage node. The first and second signals are combined using at least one subtraction operation having the first and second signals as operands.

13 Claims, 3 Drawing Sheets

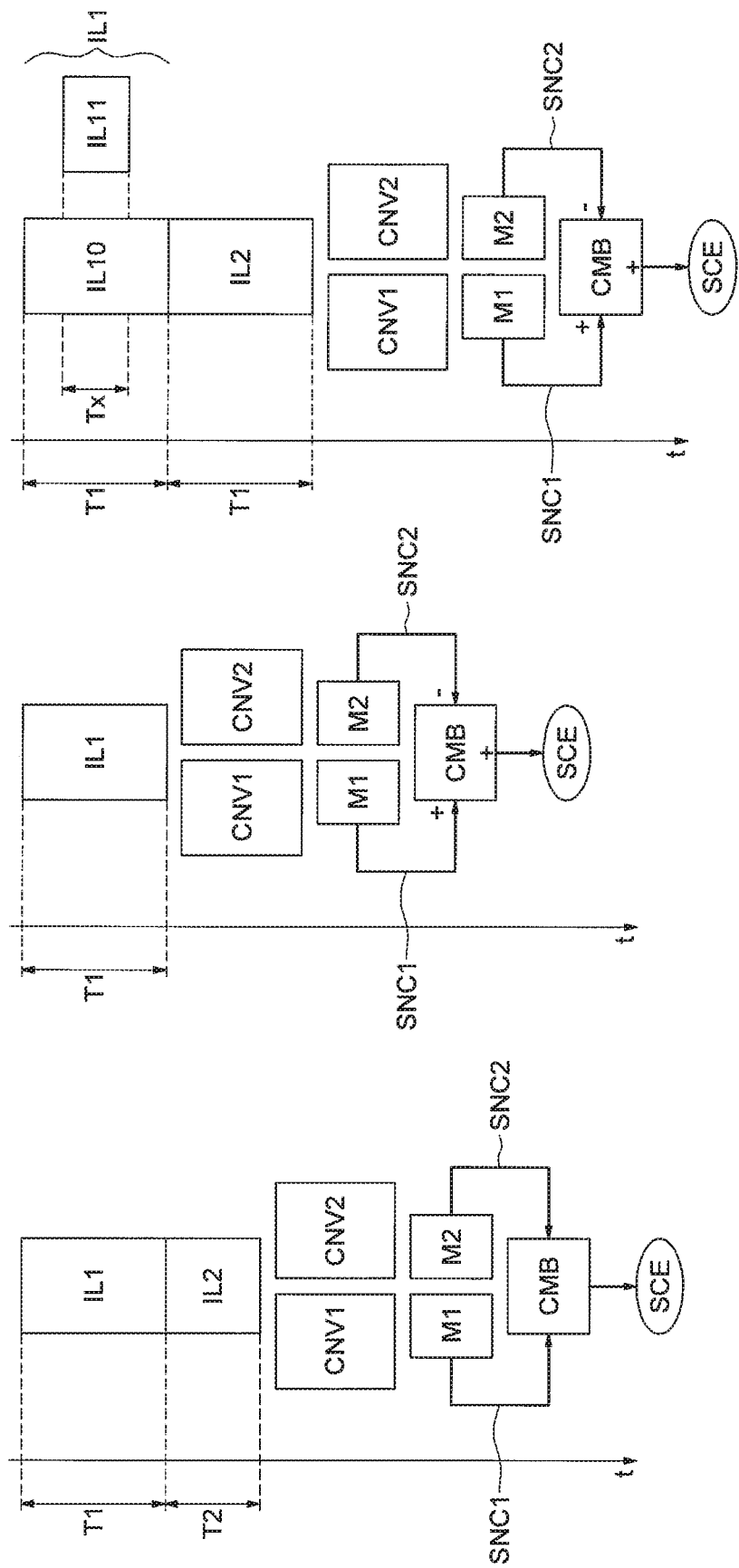

METHOD FOR PROCESSING SIGNALS FROM AN IMAGING DEVICE, AND ASSOCIATED DEVICE

BACKGROUND

Technical Field

Modes of implementation and embodiments of the disclosure relate to imagers, in particular global shutter imagers, and more particularly to the performance of processing operations on the signals from such imagers.

Description of the Related Art

Improving the quality of images captured by imaging devices may conventionally involve, for one and the same scene, performing two successive image-capturing operations, that is to say two separate illuminations of the array of pixels of the imaging device, and performing operations of combining the signals from the two image-capturing operations in order for example to remove stray components or to obtain a high dynamic range (HDR, using the acronym well known to those skilled in the art) image.

One conventional solution for performing this type of combination is to store the digital signal from the first image-capturing operation and coded on a first number of bits in a frame buffer, and then to combine it with a digital signal from a second image-capturing operation and coded on the first number of bits, so as to obtain a resulting signal coded on a second number of bits greater than the first number of bits.

BRIEF SUMMARY

The use of a frame buffer is constrictive as soon as it is desired to reduce the total area of the imaging device or there are restrictions in terms of computational capabilities.

In an embodiment, an imaging device facilitates performing combination operations between two captured images of one and the same scene, whose area is reduced and that does not require excessively great computational capabilities.

According to one aspect, what is proposed is a method for processing signals from an imager, said imager including an array of pixels each pixel of which includes a first storage node and a second storage node, the method comprising a first illumination of the pixels and a second illumination of the pixels, storing first signals from the first illumination in the first storage nodes, storing second signals from the second illumination in the second storage nodes, and, for each pixel, performing at least one elementary combination operation on the first signal and on the second signal associated with this pixel in order to obtain an elementary combined signal.

Thus, using two storage nodes makes it possible to dispense with the use of a frame buffer, and therefore to use a device having a small size and reduced computational capabilities.

The first illumination and the second illumination may have different durations or have identical durations.

Said at least one elementary combination operation may be a selection from the first signal, the second signal and a sum of the first signal and the second signal, the set of said elementary combined signals forming a high dynamic range image.

The first illumination may have a duration longer than the second illumination, and said at least one combination operation may comprise an operation of subtracting the second signal from the first signal, so as to reduce stray components in the elementary combined signal.

The first illumination may involve illuminating the pixel with ambient light for a first duration, the second illumination involving illuminating the pixel with ambient light for the first duration and with an additional light source for a second duration, said at least one elementary combination operation involving subtracting the first signal from the second signal, so as to eliminate the component of the combined signal resulting from ambient light.

Prior to said at least one elementary combination operation, it is possible to apply at least one first optical transfer function to at least one of the two signals.

The imager may be a global shutter imager.

According to another aspect, what is proposed is an imaging device, including:
  an array of pixels each pixel of which includes a first storage node and a second storage node, the pixels being able to be exposed to a first illumination and to a second illumination,
  storage means for storing first signals from the first illumination in the first storage nodes,
  storage means for storing second signals from the second illumination in the second storage nodes,
  combination means configured to perform, for each pixel, at least one elementary combination operation on the first signal and on the second signal so as to obtain an elementary combined signal.

The first illumination and the second illumination may have different durations, or have identical durations.

The combination means may be configured to make a selection from the first signal, the second signal and a sum of the first signal and the second signal, the set of said elementary combined signals forming a high dynamic range image.

The first illumination may have a duration longer than the second illumination, the combination means being configured to perform an operation of subtracting the second signal from the first signal, so as to reduce stray components in the elementary combined signal.

The first illumination may involve illuminating the pixel with ambient light for a first duration, the second illumination involving illuminating the pixel with ambient light for the first duration and with an additional light source for a second duration, the combination means being configured to subtract the first signal from the second signal, so as to eliminate the component of the combined signal resulting from ambient light.

The device may furthermore comprise modulation means configured, prior to said at least one combination operation, to apply at least one first optical transfer function to at least one of the two signals.

The imager may be a global shutter imager.

In an embodiment, a method, comprises: illuminating a pixel of an array of pixels for a first period of time, each pixel of the array having a photosensitive area, a first storage node and a second storage node; storing charge accumulated on the photosensitive area of the pixel during the first period of time on the first storage node of the pixel; illuminating the pixel of the array of pixels for a second period of time; storing charge accumulated on the photosensitive area during the second period of time on the second storage node of the pixel; generating a first signal based on the charge stored on the first storage node; generating a second signal based on the charge stored on the second storage node; and combining the first and second signals using at least one subtraction operation having the first and second signals as operands. In an embodiment, the first period of time and the second period of time have different durations. In an embodiment, the first period of time and the second period of time have a same duration. In an embodiment, the first period of time has a duration longer than a duration of the second period of time, and the second signal is subtracted from the first signal. In an embodiment, the pixel is illuminated with ambient light for the first period of time, the pixel is illuminated with ambient light for the second period of time and with an additional light source for at least part of the second period of time, and the first signal is subtracted from the second signal. In an embodiment, prior to combining the first and second signals, at least one first optical transfer function is applied to at least one of the first and second signals. In an embodiment, the array of pixels is a pixel array of a global shutter imager.

In an embodiment, a device comprises: an array of pixels, each pixel of the array having a photosensitive area, a first storage node and a second storage node; and circuitry coupled to the array of pixels, which, in operation: controls illumination of a pixel of the array of pixels for a first period of time; controls storage of charge accumulated on the photosensitive area of the pixel during the first period of time on the first storage node of the pixel; controls illumination of the pixel of the array of pixels for a second period of time; controls storage of charge accumulated on the photosensitive area during the second period of time on the second storage node of the pixel; generates a first signal based on the charge stored on the first storage node; generates a second signal based on the charge stored on the second storage node; and combines the first and second signals using at least one subtraction operation having the first and second signals as operands. In an embodiment, the first period of time and the second period of time have different durations. In an embodiment, the first period of time and the second period of time have a same duration. In an embodiment, the first period of time has a duration longer than a duration of the second period of time, and the circuitry, in operation, subtracts the second signal from the first signal. In an embodiment, the pixel is illuminated with ambient light for the first period of time, the pixel is illuminated with ambient light for the second period of time and with an additional light source for at least part of the second period of time, and the circuitry, in operation, subtracts the first signal from the second signal. In an embodiment, wherein, prior to combining the first and second signals, the circuitry, in operation, applies at least one first optical transfer function to at least one of the first and second signals. In an embodiment, the device comprises a global shutter of the array of pixels. In an embodiment, a system comprises: image processing circuitry; and a pixel array coupled to the image processing circuitry, each pixel of the array having a photosensitive area, a first storage node and a second storage node, wherein the pixel array, in operation, illuminates pixels of the array of pixels for a first period of time; stores charge accumulated on the photosensitive area of the pixels during the first period of time on respective first storage nodes of the pixels; illuminates pixels of the array of pixels for a second period of time; stores charge accumulated on the photosensitive area during the second period of time on the respective second storage nodes of the pixels; generates a first signal based on charges stored on at least some of the first storage nodes; generates a second signal based on charges stored on at least some of the second storage nodes; and combines the first and second signals using at least one subtraction operation having the first and second signals as operands. In an embodiment, the first period of time and the second period of time have a same duration. In an embodiment, the pixel is illuminated with ambient light for the first period of time, the pixel is illuminated with ambient light for the second period of time and with an additional light source for at least part of the second period of time, and the pixel array, in operation, subtracts the first signal from the second signal. In an embodiment, the first signal is generated based on charges stored on the first storage nodes of pixels of a column of the array of pixels and the second signal is generated based on charges stored on the second storage nodes of pixels of the column of the array of pixels. In an embodiment, the system comprises a global shutter. In an embodiment, the system comprises a mobile telephone including the image processing circuitry and the pixel array.

Other advantages and features of the disclosure will become apparent upon examining wholly nonlimiting example modes of implementation and embodiments of the disclosure and the appended drawings.

BRIEF DESCRIPTION OF THE SEVERAL VIEWS OF THE DRAWINGS

FIG. 3 illustrates an example operational mode of an embodiment.

FIG. 4 illustrates an example operational mode of an embodiment.

FIG. 5 illustrates an example operational mode of an embodiment.

DETAILED DESCRIPTION

Figure 1:
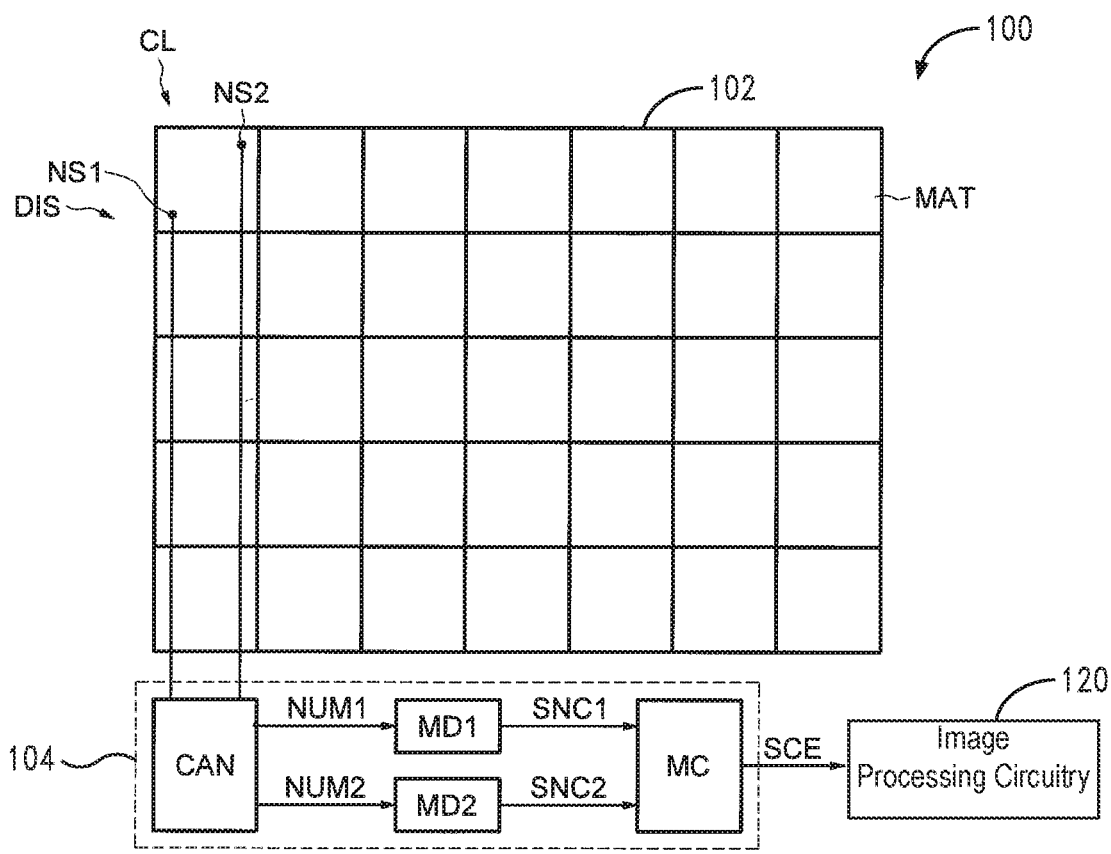
FIG. 1 is a functional block diagram of an imaging device according to an embodiment.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, multipliers, adders, dividers, comparators, transistors, integrated circuits, logic gates, finite state machines, convolutional accelerators, memories, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

FIG. 1 illustrates an imaging device 100 according to one embodiment of the disclosure. The device 100 includes an array of pixels 102, including a plurality of columns CL each column of which is coupled to processing circuitry 104 which performs processing operations on the signals from the pixels of the array.

Only the processing circuitry 104 coupled to a single column CL of the array of pixels 102 have been shown here for the sake of simplicity. In practice, each column of the array 102 may be coupled to respective processing circuitry 104.

Each pixel here includes two storage nodes NS1 and NS2, each configured to store a signal from a separate illumination of the corresponding pixel, and the processing circuitry 104 is configured to process the signals from each of the storage nodes separately.

Figure 2:
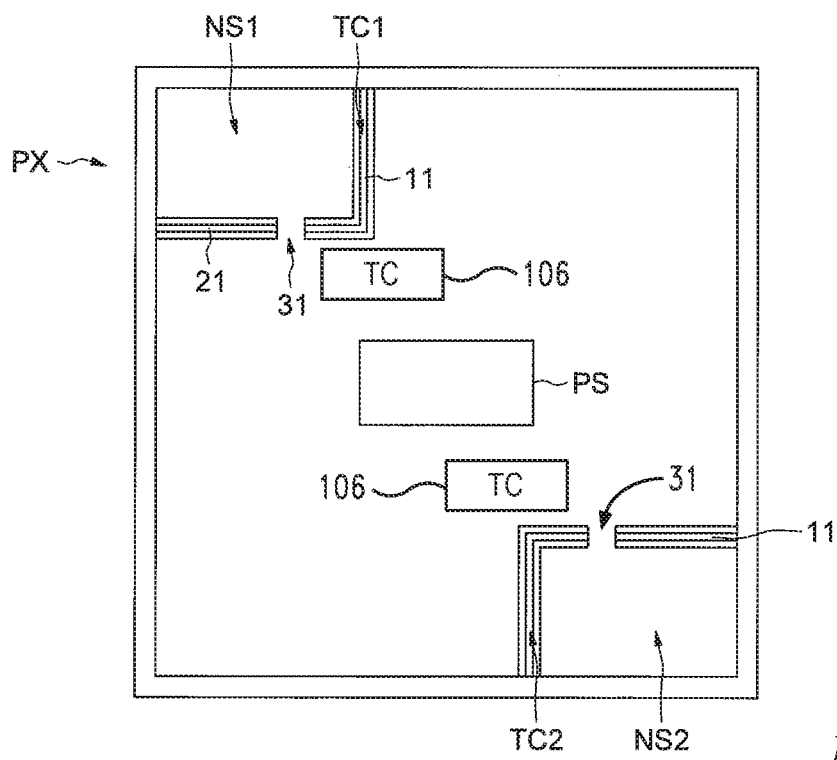
FIG. 2 is a functional block diagram of an embodiment of a pixel.

As illustrated in FIG. 2, each pixel PX of the array of pixels 102 includes a photosensitive area PS, such as a photodiode produced by implanting a region having n-type conductivity in a semiconductor substrate having p-type conductivity.

The pixels may be delineated by a deep trench isolation (DTI as it is well known to those skilled in the art) region, conventionally silicon dioxide.

Each pixel furthermore includes a first storage node NS1 and a second storage node NS2, delineated by a first capacitive trench TC1 and a second capacitive trench TC2, respectively, conventionally deep trenches lined with an insulating material 11, for example silicon oxide, and including a semiconductor material 21, for example polycrystalline silicon. The capacitive trenches TC1 and TC2 each include an aperture 31 defining a charge transfer area. The capacitive trenches may be connected here to transfer control circuitry 106 having a conventional structure (and thus the details are not shown), and form transfer gates.

The capacitive trenches TC1 and TC2 are configured, when they are biased, to transfer the charges present in the photosensitive area PS to the corresponding storage node NS1 or NS2 via the respective transfer area 31.

For example, the transfer control circuitry 106 may be configured to bias the transfer gate of the first storage node following a first illumination of the photosensitive area PS of the pixel PX, and to bias the transfer gate of the second storage node following a second illumination of the photosensitive area PS of the pixel PX.

Thus, following the first illumination and the second illumination, each of the storage nodes SN1 and SN2 contains charges.

The storage nodes NS1 and NS2 may for example be coupled to charge transfer circuits (not shown) that make it possible to transfer the charge that they contain to the transfer circuit.

For example, a transfer circuit may adopt a three-transistor architecture (3 T architecture) or four-transistor architecture (4 T architecture), both well known to those skilled in the art, and comprise follower transistors, for example one follower transistor associated with each storage node, that may conventionally be biased with a bias current in order to transfer the charge from the associated storage node.

As illustrated in FIG. 1, the processing circuitry 104 includes an analog-to-digital converter CAN, configured to convert the two analog signals from the storage nodes SN1 and SN2 into two digital signals NUM1 and NUM2, here for example signals stored on 8 bits.

The set of the first digital signals NUM1 associated with each column after the reading of all of the rows of the array MAT forms a first image representative of a scene.

The set of the second digital signals associated with each column after the reading of all of the rows of the array MAT forms a second image representative of the scene.

The processing circuitry 104 includes first modulation circuitry MD1 and second modulation circuitry MD2 coupled at the output of the analog-to-digital converter CAN and configured to receive the first digital signal NUM1 and the second digital signal NUM2, respectively.

The modulation circuitry MD1 and MD2 are configured to independently perform processing operations on the digital signals NUM1 and NUM2 and to deliver corrected digital signals SNC1 and SNC2.

For example, the respective modulation circuitry may be configured to apply, to each digital signal, a separate optical transfer function that makes it possible to correct the value of the signals NUM1 and NUM2 depending on the distribution of the luminous intensity received by each pixel and/or by each storage node.

Specifically, depending on the position of the pixels in the array, the light rays do not arrive at all of the pixels with the same incline. Additionally, the light rays may reach the storage nodes NS1 and NS2 and generate stray signals.

The processing circuitry 104 includes combination circuitry MC configured to perform at least one elementary combination operation on the first digital signal NUM1 and on the second digital signal NUM2 so as to obtain a combined elementary signal SCE.

The set of the elementary combined signals SCE from the combination circuitry MC associated with each column after the reading of all of the rows of the array forms a combined image which may be processed by image processing circuitry 120.

FIG. 3 illustrates one operational mode of an embodiment in which an imaging device, such as the imaging device 100 of FIG. 1, is configured to deliver a high dynamic range image.

In this operational mode, a first illumination IL1 of the pixels is performed for a first duration T1, and the transfer control circuitry 106 biases the first capacitive trench TC1 in order to transfer the charge accumulated in the photosensitive area during the first duration T1 to the first storage node SN1.

A second illumination IL2 of the pixels is then performed for a second duration T2 shorter than the first duration, and the transfer control circuitry 106 biases the second capacitive trench TC2 in order to transfer the charge accumulated in the photosensitive area during the second duration to the second storage node SN2.

The transfer control circuitry then biases the follower transistors of the transfer circuits associated with the pixels of the row currently being transferred, and the charges stored in the storage nodes SN1 and SN2 are transferred to the analog-to-digital converter CAN.

The analog-to-digital converter CAN performs a first conversion CNV1 of the first signal and a second conversion CNV2 of the second signal, and delivers the first digital signal NUM1 and the second digital signal NUM2, both coded, for example, on 8 bits.

The modulation circuitry MD1 and MD2 apply transfer functions M1 and M2 to each of the digital signals, and the corrected digital signals SNC1 and SNC2 are transferred to the combination circuitry MC.

The combination circuitry MC is configured here to perform an elementary combination CMB that comprises selecting from the first corrected digital signal SNC1, the second corrected digital signal SNC2 and an operation between the two signals SNC1 and SNC2, for example an addition or a subtraction, and to deliver the elementary combined signal SCE coded here on 16 bits.

The algorithms for choosing one or the other of the corrected digital signals or an operation between the two corrected digital signals SNC1 and SNC2 are conventional and known per se, and a person skilled in the art will know, after reviewing this disclosure, how to configure the combination circuitry MC according to the contemplated results of the high dynamic range image.

Thus, the set of all of the elementary combined signals SCE is a high dynamic range image in which the values of some pixels are from the first storage node, in which the values of some pixels are from the second storage node, and in which the values of some other pixels are combinations of the signals from the first storage node and the second storage node, and in which all of the pixels are coded on 16 bits.

It would moreover be possible for the elementary combined signals to be coded on a different number of bits.

According to another embodiment, the imaging device DIS 100 is configured to deliver an image in which the stray components of the elementary signals have been reduced.

FIG. 4 illustrates one mode of implementation of such a device.

In this mode of implementation, the first illumination IL1 is performed, and the second illumination IL2 is not performed. The transfer control circuitry is configured here to bias just the first capacitive trench following the first illumination IL1.

Thus, only the signal stored in the first storage node NS1 is representative of an illumination.

Although no signal has been transferred into the second storage node, it is possible for the second storage node to contain a stray signal, resulting for example from light rays received during the first illumination.

It should be noted that, as the first storage node has been exposed to the first illumination, the first signal also contains a stray component.

The combination circuitry MC is configured here to subtract the second corrected elementary digital signals SNC2 from the first corrected elementary digital signals SNC1 and to deliver an elementary combined signal SCE in which the stray component has been removed. In other words, the elementary combination CMB is a subtraction operation here.

The set of all of the elementary combined signals SCE here forms an image without a stray component, or at the very least an image in which the stray component has been reduced.

In an embodiment, it would also be possible, as illustrated in FIG. 5, to perform a first illumination IL1 that comprises two concomitant illuminations in reality. A first exposure IL10 of the pixels to a first light source for the first duration and a second exposure IL11 of the pixels to an additional light source, for example a flash, for part of the first duration T1, for example, but without limitation, of the order of one tenth of the first duration.

The second illumination IL2 has the same duration as the first illumination, but results only from the first light source, ambient light here.

An elementary combination operation performed by the combination circuitry involves subtracting the first signal SNC1 from the second signal SNC2, so as to eliminate the component of the combined signal SCE resulting from ambient light.

The image formed by the set of the elementary combined signals is thus an image representative of the illumination by the additional light source, and does not have the component representative of the illumination by the first light source, ambient light here.

The modes of implementation of the disclosure are not limited to those described above with reference to FIGS. 1 to 5, and a person skilled in the art will know after reviewing this disclosure how to configure the combination circuitry MC and choose illumination durations and light sources according to the applications under consideration.

Figure 6:
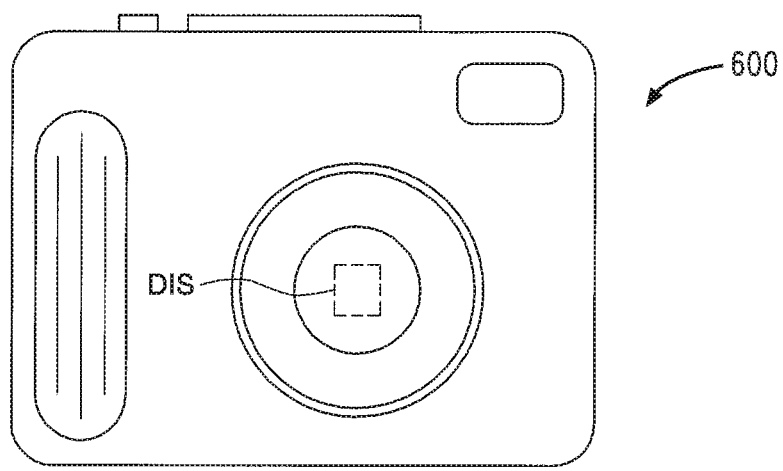
FIG. 6 is a functional block diagram of an embodiment of a digital camera including an embodiment of an imaging device.
Figure 7:
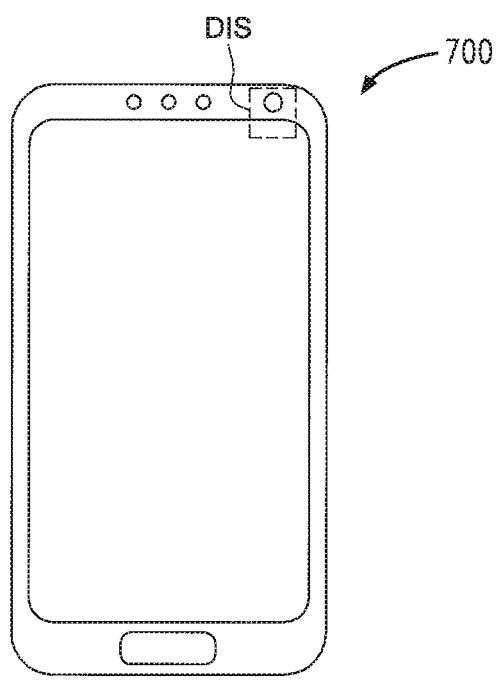
FIG. 7 is a functional block diagram of an embodiment of at mobile telephone including an embodiment of an imaging device.

The imaging device DIS as described above may be integrated into any type of system, such as for example a digital camera 600 such as the one illustrated in FIG. 6, or a mobile telephone 700 equipped with an image sensor, such as the one illustrated in FIG. 7.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments, to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    illuminating a pixel of an array of pixels with ambient light for a first period of time, each pixel of the array having a photosensitive area, a first storage node and a second storage node;
    storing charge accumulated on the photosensitive area of the pixel during the first period of time on the first storage node of the pixel;
    subsequently illuminating the pixel of the array of pixels with ambient light for a second period of time;
    illuminating the pixel of the array of pixels with an additional light source for a portion of the second period of time once during the second period of time, the portion of the second period of time being less than the second period of time;
    storing charge accumulated on the photosensitive area during the second period of time on the second storage node of the pixel;
    generating a first signal based on the charge stored on the first storage node;
    generating a second signal based on the charge stored on the second storage node; and
    combining the first and second signals using at least one subtraction operation having the first and second signals as operands, wherein the first signal is subtracted from the second signal, generating a combined signal representative of the illumination of the pixel with the additional light source for the portion of the second period of time without an ambient light component.

2. The method of claim 1, wherein the first period of time and the second period of time have a same duration.

3. The method of claim 1, wherein, prior to combining the first and second signals, at least one first optical transfer function is applied to at least one of the first and second signals.

4. The method of claim 1, wherein the array of pixels is a pixel array of a global shutter imager.

5. A device, comprising:
    an array of pixels, each pixel of the array having a photosensitive area, a first storage node and a second storage node; and
    circuitry coupled to the array of pixels, which, in operation:
        controls illumination of a pixel of the array of pixels for a first period of time;
        controls storage of charge accumulated on the photosensitive area of the pixel during the first period of time on the first storage node of the pixel;
        controls illumination of the pixel of the array of pixels for a second period of time;
        controls storage of charge accumulated on the photosensitive area during the second period of time on the second storage node of the pixel;
        generates a first signal based on the charge stored on the first storage node;
        generates a second signal based on the charge stored on the second storage node; and
        combines the first and second signals using at least one subtraction operation having the first and second signals as operands, wherein:
            the pixel is illuminated with ambient light for the first period of time,
            the pixel is subsequently illuminated with ambient light for the second period of time;
            the pixel is illuminated with an additional light source once for a portion of the second period of time, the portion of the second period of time being shorter than the second period of time; and
            the circuitry, in operation, subtracts the first signal from the second signal, generating a combined signal representative of the illumination of the pixel by the additional light source for the portion of the second period of time without an ambient light component.

6. The device of claim 5 wherein the first period of time and the second period of time have a same duration.

7. The device of claim 5, wherein, prior to combining the first and second signals, the circuitry, in operation, applies at least one first optical transfer function to at least one of the first and second signals.

8. The device of claim 5, comprising a global shutter of the array of pixels.

9. A system, comprising:
    image processing circuitry; and
    a pixel array coupled to the image processing circuitry, each pixel of the array having a photosensitive area, a first storage node and a second storage node, wherein the pixel array, in operation,
        illuminates pixels of the array of pixels for a first period of time;
        stores charge accumulated on the photosensitive area of the pixels during the first period of time on respective first storage nodes of the pixels;
        illuminates pixels of the array of pixels for a second period of time;
        stores charge accumulated on the photosensitive area during the second period of time on the respective second storage nodes of the pixels;
        generates a first signal based on charges stored on at least some of the first storage nodes; and
        generates a second signal based on charges stored on at least some of the second storage nodes, wherein:
            the pixels are illuminated with ambient light for the first period of time,
            the pixels are subsequently illuminated with ambient light for the second period of time;
            the pixels are illuminated with an additional light source once for a portion of the second period of time, the portion of the second period of time being shorter than the second period of time; and
            the first signal is subtracted from the second signal, generating an image representative of the illumination of the pixels by the additional light source for the portion of the second period of time without an ambient light component.

10. The system of claim 9 wherein the first period of time and the second period of time have a same duration.

11. The system of claim 9 wherein the first signal is generated based on charges stored on the first storage nodes of pixels of a column of the array of pixels and the second signal is generated based on charges stored on the second storage nodes of pixels of the column of the array of pixels.

12. The system of claim 9, comprising a global shutter.

13. The system of claim 9 comprising a mobile telephone including the image processing circuitry and the pixel array.

* * * * *